United States Patent
Meidan et al.

(10) Patent No.: US 10,409,861 B2
(45) Date of Patent: Sep. 10, 2019

(54) METHOD FOR FAST RETRIEVAL OF PHONETICALLY SIMILAR WORDS AND SEARCH ENGINE SYSTEM THEREFOR

(71) Applicant: WIZSOFT LTD., Tel Aviv (IL)

(72) Inventors: Abraham Meidan, Tel Aviv (IL); Oren Zbeda, Bney-Brak (IL)

(73) Assignee: WIZSOFT LTD., Tel Aviv (IL)

( * ) Notice: Subject to any disclaimer, the term of this patent is extended or adjusted under 35 U.S.C. 154(b) by 793 days.

(21) Appl. No.: 15/149,349

(22) Filed: May 9, 2016

(65) Prior Publication Data

US 2017/0323014 A1  Nov. 9, 2017

(51) Int. Cl.
*G06F 16/683* (2019.01)
*G06F 16/951* (2019.01)
*G06F 17/22* (2006.01)

(52) U.S. Cl.
CPC .......... *G06F 16/683* (2019.01); *G06F 16/951* (2019.01); *G06F 17/2264* (2013.01)

(58) Field of Classification Search
CPC combination set(s) only.
See application file for complete search history.

(56) References Cited

U.S. PATENT DOCUMENTS

| | | | |
|---|---|---|---|
| 2004/0161150 A1* | 8/2004 | Cukierman | G06K 9/222 382/186 |
| 2008/0109409 A1* | 5/2008 | Hengel | G06Q 30/02 |
| 2010/0241352 A1* | 9/2010 | Tzamaloukas | G06F 16/9537 701/465 |
| 2011/0035392 A1* | 2/2011 | Cheaz | G06F 16/3325 707/758 |
| 2014/0281943 A1* | 9/2014 | Prilepov | G06F 17/2735 715/257 |
| 2015/0213130 A1* | 7/2015 | Bennett | G06F 17/2795 707/708 |
| 2016/0154858 A1* | 6/2016 | Gopinath | G06F 16/24575 707/732 |
| 2016/0210353 A1* | 7/2016 | Holmes | G10L 15/08 |

OTHER PUBLICATIONS

Tissot et al., Fast Phonetic Similarity Search over Large Repositories, Database and Expert Systems Applications: 25th International Conference, DEXA 2014, Munich, Germany, Proceedings, Part II, Sep. 1-4, 2014.

* cited by examiner

*Primary Examiner* — Etienne P Leroux
(74) *Attorney, Agent, or Firm* — The Law Office of Joseph L. Felber

(57) ABSTRACT

Useful search results are obtained when the search logic retrieves, not only text strings, or "words," that match exactly the search arguments but also when the search logic retrieves phonetically similar words, which are misspelled. The method and system disclosed herein provide both results faster than known conventional methods and systems, and in some embodiments such speed may be achieved using conventional resources as described.

8 Claims, 2 Drawing Sheets

METHOD FOR FAST RETRIEVAL OF PHONETICALLY SIMILAR WORDS AND SEARCH ENGINE SYSTEM THEREFOR

FIELD

The field of the technology disclosed herein includes phonetic search engine systems.

BACKGROUND

A search engine is computer software used to search data for specified information. The software of course must reside on hardware for execution. Accordingly, the terminology "search engine system" as used herein references a search engine and its supporting hardware. Some embodiments of search engine systems search for character strings, or "words," in a set of documents and return lists of the documents containing the words. Other embodiments of search engine systems search a single document for specified words and return indications of where the words are located within the searched document. Some embodiments of search engine systems do both.

It is frequently desired that a search engine achieve two goals: retrieving results accurately and retrieving those results fast. The right innovative combination of many known individual components working together in a new way can drastically affect performance over conventional search engines and thus achieve one or both of those goals. The present disclosure focuses as follows on achieving both goals when executing a specific type of search engine system.

Consider a visitor to a lengthy web page, a manager accessing an ERP (enterprise resource planning) comprehensive electronic report, or anyone opening a large electronic file with a text editor and observing a large amount of text without necessarily seeing immediately the particular item of information that interests him/her. (Hereinafter, for simplicity of discussion and not to limit the disclosure, the male pronouns are used arbitrarily to reference users of either gender.) In such a situations, and in many analogous situations, the user can find the information of interest by text searching an appropriately-chosen text string or word (or name), hereinafter referred to sometimes as a "search argument." An example would be searching for the word "olga" in a large web page to find the location therein of a portion of text that discusses Olga Korbut's performance in the 1972 Summer Olympic Games.

A problem arises when the user does not spell the search argument correctly. If the search utility retrieves only text that matches the spelling of a search argument, the incorrectly-spelled search argument would not enable retrieval of the information of interest. Misspelled word entry occurs not only when a user, who knows how to spell the word correctly, accidentally enters a typographical error, but also when the user does not know the correct spelling and attempts to search using an incorrectly-spelled entry. A user unsure of a correct spelling may need to conduct multiple searches to find the information of interest.

Regardless of whether a user thinks he knows a correct spelling of a word or he instead intentionally guesses at the correct spelling, the word's sound strongly influences how many users spell a word. Accordingly, algorithms, known as "phonetic algorithms," have been developed to index words according to their pronunciations and thus assist users in finding the text that interests them within large documents or within large sets of documents. A search engine implementing a phonetic algorithm is a phonetic search engine, and a phonetic search engine and its supporting hardware is a phonetic search engine system in the context of the present disclosure.

Accordingly, to operate a phonetic search engine system, a user merely needs to enter how he thinks a word is spelled, and the algorithm retrieves words that sound similar to the word. For example, some phonetic algorithms will retrieve the words "Alan" and "Allen," when a user enters only "Alan." If "Allen" is the spelling associated with the information that interests the user, the phonetic algorithm would enable him to find information that his improper spelling would not have allowed, if the user instead used an algorithm that retrieved only exact character string matches.

Phonetic algorithms, even historic phonetic algorithms, implemented elaborate logic. An early phonetic algorithm, Soundex, produced a code for a search word and also for words within the document to be searched. The Soundex code for a particular word began with the first letter of the word to be coded, and all subsequent vowels and the letters "h", "y", and "w" were omitted from the code. The letters after the first letter of the words to be coded, which were consonants, were replaced by a number that was associated with a group of letters that were articulated similarly. For example, the number "1" was associated with the labial consonants "b", "f", "p", and "v". If the same articulation number was associated with two or more adjacent letters in the words, each such letter after the first was omitted. If the same articulation number was associated with two letters separated by "h" or "w", the second letter was omitted. If instead two letters of the original word having the same articulation number were separated by a vowel, the articulation number was used twice. The Soundex code had the original letter and three numbers. Zeros were added at the end, if the word did not have enough letters suitable for providing three articulation numbers, and articulation numbers were not added to the Soundex code after the first three are generated. Accordingly, "baby" and "babe" both have the Soundex code B100.

Although the Soundex phonetic algorithm became widely accepted, search engines systems were nonetheless subsequently developed to more accurately retrieve phonetically similar words from files stored on the computer systems. Consider the following example system configured to retrieve from computer files (1) words having the same consonants as those in the search argument and in the same order, (2) words having the same consonants in the same order except for one consonant that is entered incorrectly, and (3) words having the same consonants in the same order except for one missing consonant. While this search engine system indeed meets the goal for increased accuracy over the systems implementing the Soundex algorithm, the search engine does not meet the goal of increased speed.

This algorithm is slow, because the algorithm requires, for each search for a particular search argument having N consonants, (1) one search for words having the same consonants in the same order as those of the search argument, (2) 20N searches for words having the same consonants in the same order expect for one consonant that is entered incorrectly, and (3) 21(N+1) searches for words having the same consonants in the same order except for one missing consonant. This analysis assumes a search in the English language with 21 consonants. A search in another language or a search in English with a different number of letters designated as consonants for the particular phonetic algorithm would have different quantitative results, but the basic principle is the same.

The reason that 1+20N+21(N+1)=41N+22 searches are necessary to search for one word is the following: First, for this algorithm there are 21 designated consonants in the English language. The reason that there are 20N searches required when checking for words having the same consonants in the same order expect for one consonant that is entered incorrectly is that there are N consonants in a search argument that could have been entered incorrectly and 20 possibilities for the incorrectly entered consonant. The reason that there are 21(N+1) searches for the correct word when the search argument was entered with one missing consonant is that, for a search argument having N consonants, there are N+1 possible places where the missing consonant was supposed to be and there are 21 possibilities for the omitted consonant.

Executing 41N+22 searches in response to one word entered as the search argument is quite resource intensive. Accordingly, the present inventors endeavored to develop a new phonetic search engine system that met both the goals of accuracy and speed. They realized that the goals could be met by using new components, known components combined in new synergistic ways, or a combination of both.

SUMMARY

Disclosed herein is a method for fast retrieval of phonetically similar words and a search system engine therefor. The method and the search engine system are both accurate and much faster than other methods/search engine systems known to the inventors.

The invention may be embodied as a method of phonetically retrieving words from a source file. The source file is associated with an index file that contains a record for each word to be tested for phonetic similarity. The record has a primary string of letters and secondary strings of letters from the word. The $i^{th}$ secondary string is generated by omitting the $i^{th}$ letter from the primary string. The method comprises: receiving by a search system from a user device a word to be searched, the word becoming a search argument; generating by the search system a primary string of letters and secondary strings of letters from the search argument, the argument's $i^{th}$ secondary string generated by omitting the $i^{th}$ letter from the argument's primary string; searching the records' primary strings for equivalence with the argument's primary string and marking records containing equivalent primary strings; searching each record's $i^{th}$ secondary string for equivalence with the argument's $i^{th}$ secondary string and marking records containing equivalent $i^{th}$ secondary strings; searching each secondary string of each record for equivalence with the argument's primary string and marking records containing equivalent secondary strings; searching the records' primary strings for equivalence with each of the argument's secondary strings and marking records containing equivalent primary strings; generating one or more tertiary strings of letters from the search argument, the argument's $i^{th}$ tertiary string formed from the argument's primary string by transposing the ith letter with the $(i+1)^{th}$ letter of the argument's primary string; searching the records' primary strings for equivalence with each of the argument's tertiary strings and marking records containing equivalent primary strings; and for each marked record, retrieving the word from the source file that is associated with the marked record in the index file.

The invention may be embodied instead as a different method of phonetically retrieving words from a source file that is associated with an index file. The index file still contains a record for each word to be tested for phonetic similarity, the record having a primary string of letters and secondary strings of letters from the word, the $i^{th}$ secondary string generated by omitting the $i^{th}$ letter from the primary string. In this case, though, the method comprises: receiving by a search system from a user device a word to be searched, the word becoming a search argument; generating by the search system a primary string of letters and secondary strings of letters from the search argument, the argument's $i^{th}$ secondary string generated by omitting the $i^{th}$ letter from the argument's primary string; searching the records' primary strings for equivalence with the argument's primary string and marking records containing equivalent primary strings; searching each record's $i^{th}$ secondary string for equivalence with the argument's $i^{th}$ secondary string and marking records containing equivalent $i^{th}$ secondary strings; searching each secondary string of each record for equivalence with the argument's primary string and marking records containing equivalent secondary strings; and for each marked record, retrieving the word from the source file that is associated with the marked record in the index file.

The invention may further be embodied as a phonetic search engine system for retrieving words from a source file that is associated with an index file. The index file contains a record for each word to be tested for phonetic similarity, the record having a primary string of letters and secondary strings of letters from the word, the $i^{th}$ secondary string generated by omitting the $i^{th}$ letter from the primary string. The search engine comprises: one or more interfaces, a processor, and storage. The one or more interfaces are operative: (1) to receive from a user device a word to be searched, the word becoming a search argument, and (2) to send to the user device search results. The processor is operatively connected to the one or more interfaces. The storage is operatively connected to the processor and holds instructions. The instructions when executed activate the processor to: generate a primary string of letters and secondary strings of letters from the search argument, the argument's $i^{th}$ secondary string generated by omitting the $i^{th}$ letter from the argument's primary string; search the records' primary strings for equivalence with the argument's primary string and marking records containing equivalent primary strings; search each record's $i^{th}$ secondary string for equivalence with the argument's $i^{th}$ secondary string and marking records containing equivalent $i^{th}$ secondary strings; search each secondary string of each record for equivalence with the argument's primary string and marking records containing equivalent secondary strings; and for each marked record, retrieve the word from the source file that is associated with the marked record in the index file. The retrieved words become the search results to send to the user device.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The invention summarized above and defined by the claims below will be better understood by referring to the present detailed description of embodiments of the invention. This description is not intended to limit the scope of claims but instead to provide examples of the invention. Described first is an example of the invention embodied as a phonetic search engine system. Described next are examples of the invention embodied as methods of phonetically retrieving words.

Figure 1:
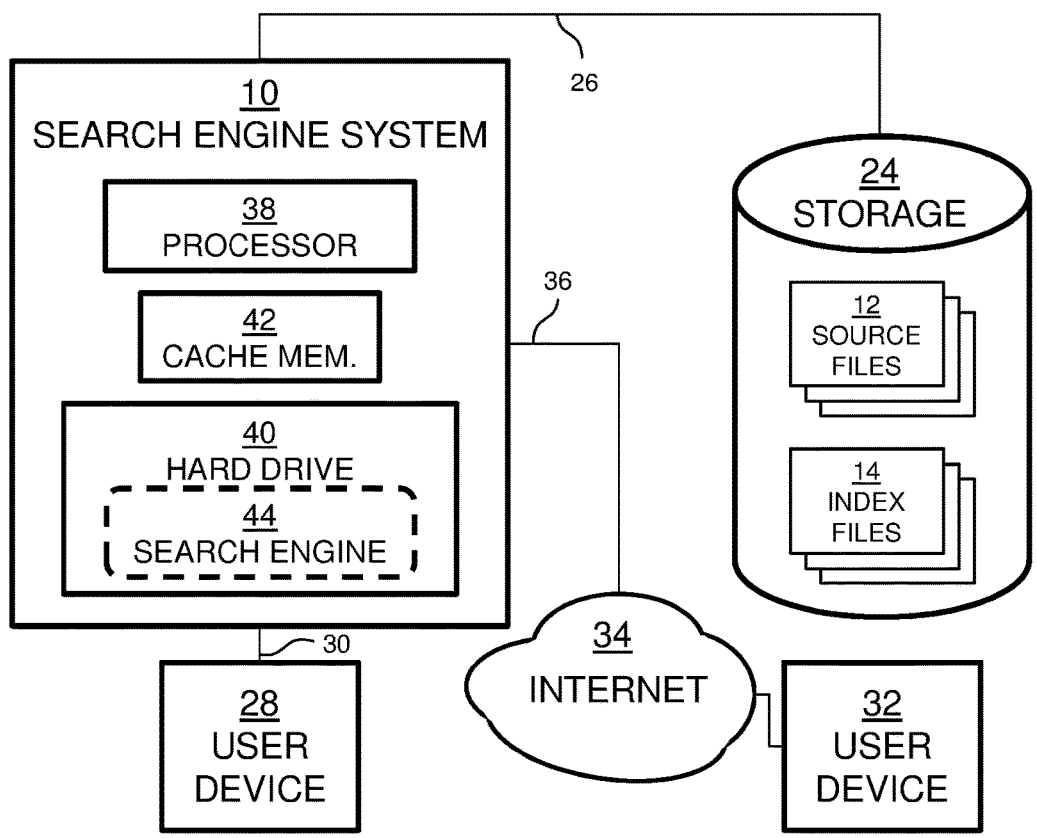
FIG. 1 provides a schematic representation of a phonetic search engine in accordance with an embodiment of the invention.

The first embodiment of the invention is a type of search system described with reference to FIG. 1. More specifically, the first embodiment is a phonetic search engine system 10 that retrieves words from at least one file 12, termed a "source file." Example source files, as discussed above, include lengthy web pages and ERP reports, and it is desirable for users to be able to quickly retrieve information from the file(s), even if they do not know how to spell the word for which they search.

Figure 2:
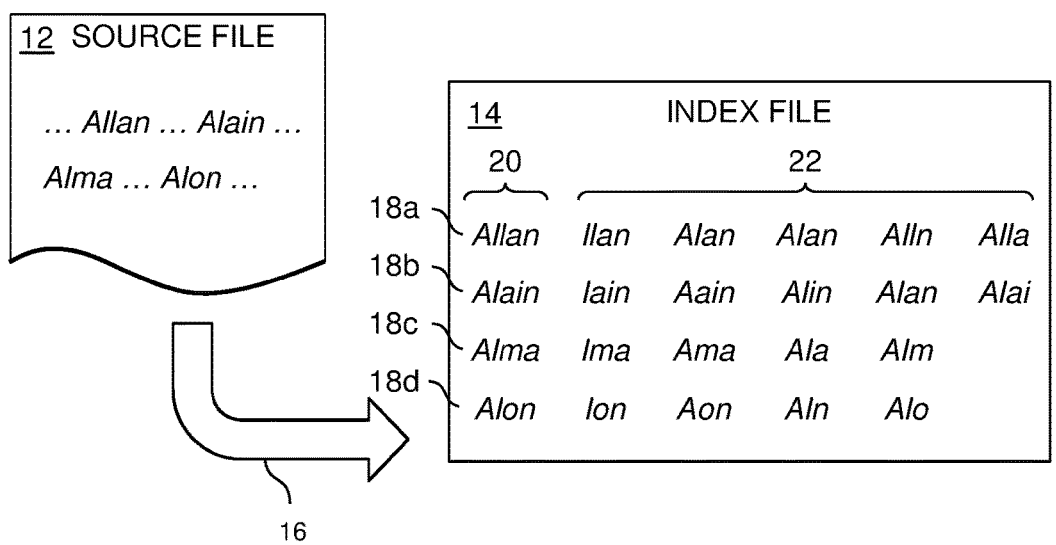
FIG. 2 provides an example source file and derived index file that are compatible with the phonetic search engine system of FIG. 1.

The file to be searched, the source file, has an associated index file generated as follows: Both the source file and the index file are electronic computer files, and the index file contains a record for each word in the source file that might be tested for phonetic similarity with a word that might be searched (the "search argument"). The record for each word, a potential search argument, has a primary string of letters from the word and secondary strings of letters obtained from the primary string. The $i^{th}$ secondary string is generated by omitting the $i^{th}$ letter from the primary string, the variable "i" indicating the ordinal number of the letter's place in the word. An example index file is generated as follows:

In this example, the source file 12 includes the names "Allan," "Alain," "Alma," and "Alon," as illustrated in FIG. 2. Each of these words is a potential search argument. Even though the present example uses only proper names as potential search arguments, the embodiment also works when other words are used as search arguments.

An index file 14 is generated 16 from the source file 12 by providing a record 18a, 18b, 18c, and 18d for the words "Allan," "Alain," "Alma," and "Alon," respectively. Each record 18a, 18b, 18c, and 18d has a primary string 20, which in this example is identical to the associated word in the source file 12. (The invention is not limited accordingly, as discussed below.) Each record 18a, 18b, 18c, and 18d also has a set of secondary strings 22. In accordance with the formula presented above, for the word "Allan" in the source file 12 the first second secondary string is "llan," the second secondary string is "Alan," and so on. Secondary strings for the other words "Alain," "Alma," and "Alon" in the source file 12 are generated in like fashion.

In the first embodiment of the invention, the source files 12 and index files 14 reside in storage 24 external to the search engine, but the invention as a whole is not limited accordingly. As an example, the storage 24 may be an external USB flash drive. In alternate embodiments, the source and/or index files may reside on internal storage of a search engine system or on the same server computer upon which the search engine software resides, as non-limiting examples. In the present embodiment, the search engine system 10 communicates with the storage 24 through an interface 26, which may include a USB socket, a USB plug, and the leads serving as part of the circuit path between the search engine system 10 and the storage 24.

A user may operate the search engine system 10 by accessing a user device 28 directly connected to the search engine system 10 through an interface 30 or by accessing a user device 32 that communicates with the search engine system 10 through the Internet 34. Example user devices include personal computers, workstations, smart phones, and tablets. In this embodiment, the search engine system 10 is connected to the Internet 34 through an interface 36. Examples of such interfaces 30, 36 include known wired or wireless connections. Generally, the interfaces 30, 36 are operative to receive from the user devices 28, 32, respectively, a word to be searched and to send search results to the user devices 28, 32. In alternate embodiments, both the search engine and user device functionalities are provided by the same computing device, for example, a personal computer or work station, and the interface functionality is provided by the media for signal flow between components.

The search engine system 10 also includes a processor 38, which is operatively connected to the interfaces 26, 30, and 36. Non-limiting examples of such a processor 38 include an Intel Pentium Processor E5400 and an Intel Xeon 5130 CPU.

Figure 3:
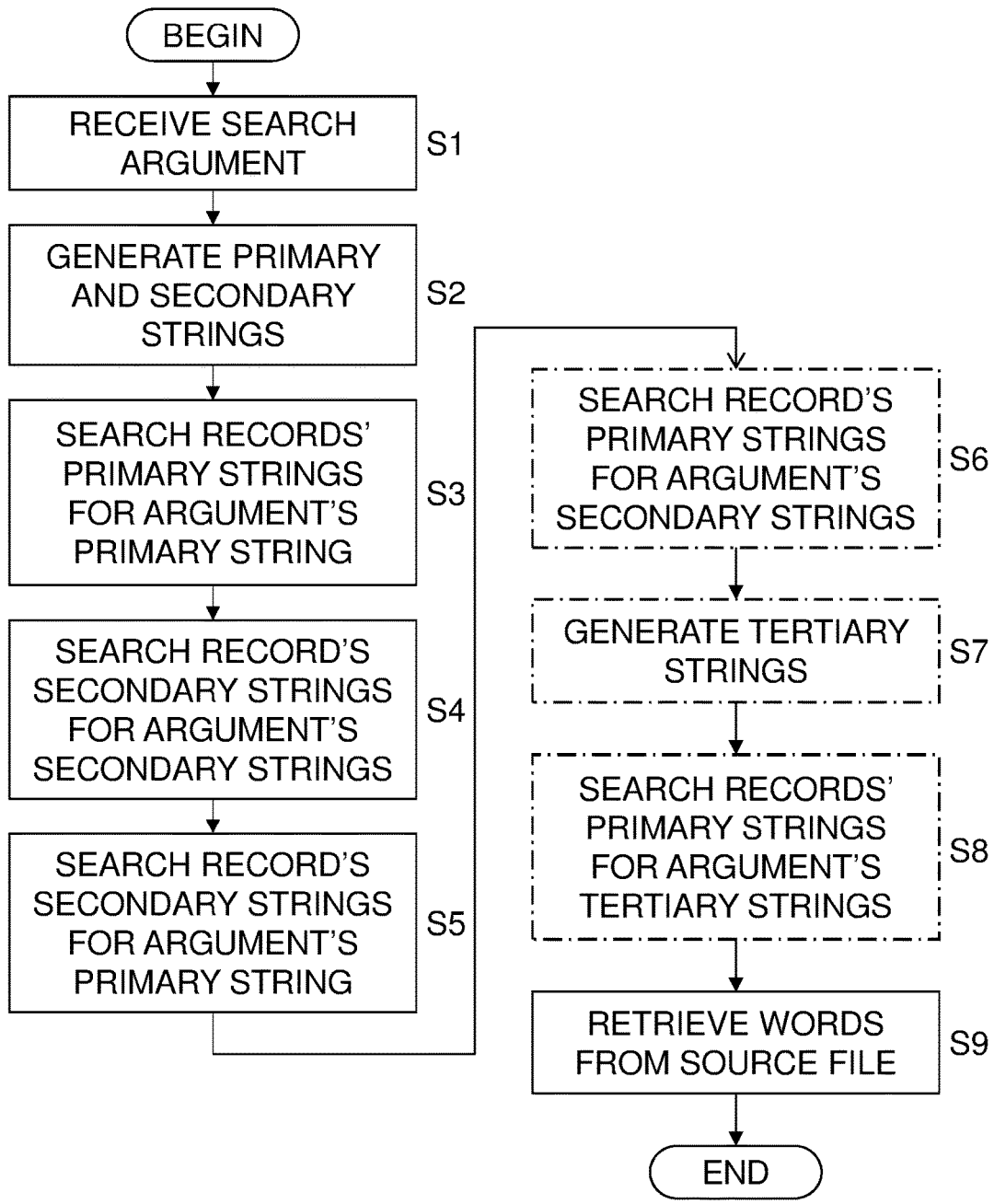
FIG. 3 provides a flowchart representative of methods of phonetically retrieving words in accordance with alternate embodiments of the invention.

The search engine system 10 further includes storage operatively connected to the processor 38. Types of storage include a hard drive 40 and cache memory 42. Non-limiting examples of hardware suitable for implementation as the hard drive 40 include a SATA hard drive and a flash memory SSD. A non-limiting example of a cache memory is one that is part of an external drive. In the present embodiment, search engine software 44 resides on the hard drive 40. That is, the hard drive 40 holds instructions that when executed activate the processor 38 to perform a sequence of steps that quickly find words in the source file 12 that the processor 38 sends to the requesting user device 28 as search results. Examples of such sequence of steps are discussed with reference to FIG. 3 next.

The second embodiment of the invention described herein is a method of phonetically retrieving words from a source file. The method may be executed using the search engine system 10 illustrated in FIG. 1. The source file is associated with an index file. A non-limiting exemplary way of generating the index file is discussed above with reference to FIG. 2. The individual steps of the method are discussed with reference to FIG. 3 as follows:

The first step of the method is to operate the search system to receive from a user device a word to be searched. (Step S1.) Such word in this discussion is called the "search argument." Typically, a user wanting to find a word in a document (source file), but not necessarily knowing with certainty how to spell the word, enters the best spelling of the word he is capable of providing into a user device, such as user device 28 or 32 in FIG. 1. Many users base their beliefs or suspicions of how words are spelled according to how the words sound. Accordingly, this method for fast retrieval of phonetically similar words is desirable for such situations.

The next step of the present embodiment of the invention is to generate by the search system a primary string of letters and secondary strings of letters from the search argument. (Step S2.) The search argument's $i^{th}$ secondary string is generated by omitting the $i^{th}$ letter from the argument's primary string, the variable "i" indicating the ordinal number of the letter's place in the word.

As an example of a search system executing step S2, consider a user interested in finding the word "Allan" in the source file, but the user misspells "Allan." First, he enters "Alan," and then he tries "Allen," as these are two common ways of spelling the name. As primary strings of letters, the search system generates the same letters in the same sequences as that in the search arguments, in this non-limiting example of primary strings. Accordingly, the primary and secondary strings for the first search argument is "Alan," "lan," "Aan," "Aln," and "Ala," and the primary and secondary strings for the second search argument is "Allen," "llen," "Alen," "Alen," "Alln," and "Alle."

Although this embodiment of the invention was developed to retrieve words of interest even when a user misspells the word in the search argument, the embodiment must also retrieve words when the user spells the search argument correctly. Accordingly, the next step of the present embodiment is to search within the index file the records' primary strings for equivalence with the argument's primary string and then to mark records containing equivalent primary strings. (Step S3.) With reference again to the example search arguments and index file, the search system finds no equivalence of "Alan" and "Allen" with any primary strings in the index file records. Thus, no records are marked in this step of the present example.

One type of spelling error this embodiment was developed to accept and process properly is spelling the search argument with one incorrect letter while the other letters are correct and in the correct order. Thus, the next step of the method is to search within the index file each record's $i^{th}$ secondary string for equivalence with the argument's $i^{th}$ secondary string and to mark records containing equivalent $i^{th}$ secondary strings. (Step S4.) With reference to the present example, first with "Alan" as the search argument, there is equivalence of the third secondary string of record 18d with the search argument's third secondary string ("Aln" in both cases), so that record is marked. With "Allen" as the search argument, there is equivalence of the fourth secondary string of record 18a with the search argument's fourth secondary string ("Alln" in both cases), so that record is marked.

Another spelling error that this embodiment was developed to process properly is misspelling a word by omitting a letter while all while the other letters are correct and in the correct order. Accordingly, the following step in the method is to search within the index file each secondary string of each record for equivalence with the argument's primary string and to mark records containing equivalent secondary strings. (Step S5.) For the search argument "Alan," there is equivalence with the second and third secondary strings of record 18a and with the fourth secondary string of record 18b, so those two records are marked. For the search argument "Allen," no equivalence is found, so no additional record is marked for this search argument.

The present embodiment was also developed to process a misspelled argument that incorrectly has an extra letter while the other letters in the word are correct and in the correct order. Accordingly, the next step is to search within the index file the records' primary strings for equivalence with each of the search argument's secondary strings and then mark the records containing equivalent primary strings. (Step S6.) For both the search arguments "Alan" and "Allen," there is no equivalence, and no records are marked.

Yet another spelling error that the present embodiment was developed to accept and to process correctly is transposing adjacent letters in a search argument. Accordingly, the following two steps of the method are as follows:

The first step at this stage of the method is to generate for the index file one or more tertiary strings of letters from the search argument such that the argument's $i^{th}$ tertiary string is formed from the argument's primary string by transposing the $i^{th}$ letter with the $(i+1)^{th}$ letter of the argument's primary string. (Step S7.) As earlier in this disclosure, the variable "i" indicates the ordinal number of the letter's place in the word. The tertiary string for the search argument "Alan" is "lAan," "Aaln," and "Alna." The tertiary string for the search argument "Allen" is "lAllen," "Allen," "Aleln," and "Allne." As is apparent, for a search argument having n letters, there are n−1 elements in the associated tertiary string.

With the tertiary strings generated, the next step is to search within the index file the records' primary strings for equivalence with each of the argument's tertiary strings and to mark records containing equivalent primary strings. (Step S8.) For both the search arguments "Alan" and "Allen," there is no equivalence, and no records are marked.

With the preceding steps completed, the system returns search results to the user. Accordingly, the next step is retrieving, for each record that had been marked in the preceding steps, the word from the source file that is associated with the marked record in the index file. (Step S9.) Thus, when "Alan" is entered as the search argument, records 18a, 18b, and 18d are marked, so "Allan," "Alain," and "Alon" are retrieved. When "Allen" is entered as the search argument, record 18a is marked, so "Allan" is retrieved. As stated above, in this example the user is interested in finding the word "Allan" in the source file, so the present method retrieves the intended word even when the user misspells it as "Alan" and "Allen."

The method has concluded. While step S7 needs to be executed before step S8, variations in the order of some of the other steps are within the scope of the invention. For example, the order of steps S3-S6 may be altered. Additional variations of the first embodiments are available. One example, described next, is the method in which a primary string of letters is generated.

In the first embodiment, the primary strings of letters in records of the index file and the primary string of letters from the search argument are identical to letters of the associated word in the source file and to the letters of the search argument, respectively. In a variation of this embodiment, the primary strings are generated by: (1) omitting all vowels from the word to be tested for phonetic similarity or from the search argument, except the first letters, if the first letters are vowels; and (2) if two adjacent letters are the same consonant, omitting one of the two adjacent letters.

For returning search results to the user, the method may include sorting the results according to set criteria. One criterion is to sort the retrieved words according to their similarity to the word searched, that is, their similarity to the search argument. Non-limiting examples of algorithm suitable for sorting the retrieved words include Levenstein and Jaro-Winkler algorithms. Another criterion is based on the observation that typically source files have repetitions of words that are indexed, so the search results may have a particular word or words retrieved multiple times. For such situations, the retrieved words may be sorted according to the number of marked records associated with each word. For example, a word found five times is displayed before a word found two times.

The third embodiment of the invention described herein is, also like the second embodiment, a method of phonetically retrieving words from a source file. The difference from the second embodiment is that this method does not include steps S6-S8 of the second embodiment. Reference is made again to FIG. 3, which presents boxes S6, S7, and S8 using broken lines to indicate that the third embodiment does not include the corresponding steps. Variations of the third embodiment are within the scope of the invention, though. For example, the third embodiment may be modified to include step S6 of the second embodiment but not steps S7 and S8. Another example is that the third embodiment may be modified to include steps S7 and S8 of the second embodiment but not step S6.

Another modification of the third embodiment is generating the primary strings by: (1) omitting all vowels from the word to be tested for phonetic similarity or from the search argument, except the first letters, if the first letters are vowels; and (2) if two adjacent letters are the same consonant, omitting one of the two adjacent letters.

The third embodiment may also be modified, analogously to how the second embodiment may be modified, by including set criteria for sorting results. One criterion is to sort the retrieved words according to their similarity to the word searched, that is, their similarity to the search argument. Another criterion is sorting the retrieved words according to the number of marked records associated with each word.

The third embodiment and many of its modifications execute 1+N+N=2N+1 searches, as opposed to the 41N+22 searches executed by the analogous method discussed above in the background section. The number of searches for the third embodiment is computed as follows:

For comparison purposes, letters that are not one of the 21 consonants of the English language are omitted for both the modified third embodiment and the method of the background, and in both methods a particular search argument has N consonants. For step S3 of the third embodiment, there is one search for words having the same consonants in the same order as those of the search argument. For step S4, there are N searches, because for each of N consonants of the search argument there is one search of the index file records' $i^{th}$ secondary strings for equivalence with the search argument's $i^{th}$ secondary string. For step S5, there are N searches, because for each of N consonants of the search argument there is one search of the index file records' $i^{th}$ secondary strings for equivalence with the search argument's primary string. Clearly, a method executing only 2N+1 searches is superior to a method executing 41N+22 searches, as it requires much less processing power and is much faster.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. For example, the searches of steps S3-S6 and S8 of the embodiments discussed above may be binary or B-tree searches, as non-limiting examples. Accordingly, the foregoing discussion is intended to be illustrative only; the invention is limited and defined only by the following claims and equivalents thereto.

What is claimed is:

1. A method of phonetically retrieving words from a source file that is associated with an index file, the index file containing a record for each word to be tested for phonetic similarity, the record having a primary string of letters and secondary strings of letters from the word, the $i^{th}$ secondary string generated by omitting the $i^{th}$ letter from the primary string, the method comprising:
   receiving by a search system from a user device a word to be searched, the word becoming a search argument;
   generating by the search system a primary string of letters and secondary strings of letters from the search argument, the argument's $i^{th}$ secondary string generated by omitting the $i^{th}$ letter from the argument's primary string;
   searching the records' primary strings for equivalence with the argument's primary string and marking records containing equivalent primary strings;
   searching each record's $i^{th}$ secondary string for equivalence with the argument's $i^{th}$ secondary string and marking records containing equivalent $i^{th}$ secondary strings;
   searching each secondary string of each record for equivalence with the argument's primary string and marking records containing equivalent secondary strings;
   searching the records' primary strings for equivalence with each of the argument's secondary strings and marking records containing equivalent primary strings;
   generating one or more tertiary strings of letters from the search argument, the argument's $i^{th}$ tertiary string formed from the argument's primary string by transposing the $i^{th}$ letter with the $(i+1)^{th}$ letter of the argument's primary string;
   searching the records' primary strings for equivalence with each of the argument's tertiary strings and marking records containing equivalent primary strings; and
   for each marked record, retrieving the word from the source file that is associated with the marked record in the index file.

2. The method of claim 1, wherein the primary strings of letters in the records of the index file and the primary string of letters from the search argument are generated by:
   omitting all vowels from the word to be tested for phonetic similarity and from the search argument, except the first letters, if the first letters are vowels; and
   if two adjacent letters are the same consonant, omitting one of the two adjacent letters.

3. The method of claim 1 further comprising:
   sorting the retrieved words according to their similarity to the word to be searched.

4. The method of claim 1 further comprising:
   sorting the retrieved words according to the number of marked records associated with each word.

5. A method of phonetically retrieving words from a source file that is associated with an index file, the index file containing a record for each word to be tested for phonetic similarity, the record having a primary string of letters and secondary strings of letters from the word, the $i^{th}$ secondary string generated by omitting the $i^{th}$ letter from the primary string, the method comprising:
   receiving by a search system from a user device a word to be searched, the word becoming a search argument;
   generating by the search system a primary string of letters and secondary strings of letters from the search argument, the argument's $i^{th}$ secondary string generated by omitting the $i^{th}$ letter from the argument's primary string;
   searching the records' primary strings for equivalence with the argument's primary string and marking records containing equivalent primary strings;
   searching each record's $i^{th}$ secondary string for equivalence with the argument's $i^{th}$ secondary string and marking records containing equivalent $i^{th}$ secondary strings;
   searching each secondary string of each record for equivalence with the argument's primary string and marking records containing equivalent secondary strings; and for each marked record, retrieving the word from the source file that is associated with the marked record in the index file;
generating one or more tertiary strings of letters from the search argument, the argument's $i^{th}$ tertiary string formed from the argument's primary string by transposing the $i^{th}$ letter with the $(i+1)^{th}$ letter of the argument's primary string;
searching the records' primary strings for equivalence with each of the argument's tertiary strings and marking records containing equivalent primary strings; and
for each marked record, retrieving the word from the source file that is associated with the marked record in the index file.

6. A method of phonetically retrieving words from a source file that is associated with an index file, the index file containing a record for each word to be tested for phonetic similarity, the record having a primary string of letters and secondary strings of letters from the word, the $i^{th}$ secondary string generated by omitting the $i^{th}$ letter from the primary string, the method comprising:
receiving by a search system from a user device a word to be searched, the word becoming a search argument;
generating by the search system a primary string of letters and secondary strings of letters from the search argument, the argument's $i^{th}$ secondary string generated by omitting the $i^{th}$ letter from the argument's primary string;
searching the records' primary strings for equivalence with the argument's primary string and marking records containing equivalent primary strings;
searching each record's $i^{th}$ secondary string for equivalence with the argument's $i^{th}$ secondary string and marking records containing equivalent $i^{th}$ secondary strings;
searching each secondary string of each record for equivalence with the argument's primary string and marking records containing equivalent secondary strings; and
for each marked record, retrieving the word from the source file that is associated with the marked record in the index file;
wherein the primary string of letters in the records of the index file and the primary string of letters from the search argument are generated by:
omitting all vowels from the word to be tested for phonetic similarity and from the search argument, except the first letters, if the first letters are vowels; and
if two adjacent letters are the same consonant, omitting one of the two adjacent letters.

7. A phonetic search engine system for retrieving words from a source file that is associated with an index file, the index file containing a record for each word to be tested for phonetic similarity, the record having a primary string of letters and secondary strings of letters from the word, the $i^{th}$ secondary string generated by omitting the $i^{th}$ letter from the primary string, the search engine comprising:
one or more interfaces operative: (1) to receive from a user device a word to be searched, the word becoming a search argument, and (2) to send to the user device search results;
a processor operatively connected to the one or more interfaces; and
storage operatively connected to the processor and holding instructions that when executed activate the processor to:
generate a primary string of letters and secondary strings of letters from the search argument, the argument's $i^{th}$ secondary string generated by omitting the $i^{th}$ letter from the argument's primary string;
search the records' primary strings for equivalence with the argument's primary string and marking records containing equivalent primary strings;
search each record's $i^{th}$ secondary string for equivalence with the argument's $i^{th}$ secondary string and marking records containing equivalent $i^{th}$ secondary strings;
search each secondary string of each record for equivalence with the argument's primary string and marking records containing equivalent secondary strings; and
for each marked record, retrieve the word from the source file that is associated with the marked record in the index file;
wherein the retrieved words become the search results to send to the user device; and
wherein the storage holds additional instructions that when executed activate the processor also to:
generate one or more tertiary strings of letters from the search argument, the argument's $i^{th}$ tertiary string formed from the argument's primary string by transposing the $i^{th}$ letter with the $(i+1)^{th}$ letter of the argument's primary string;
search the records' primary strings for equivalence with each of the argument's tertiary strings and marking records containing equivalent primary strings; and
for each marked record, retrieve the word from the source file that is associated with the marked record in the index file.

8. A phonetic search engine system for retrieving words from a source file that is associated with an index file, the index file containing a record for each word to be tested for phonetic similarity, the record having a primary string of letters and secondary strings of letters from the word, the $i^{th}$ secondary string generated by omitting the $i^{th}$ letter from the primary string, the search engine comprising:
one or more interfaces operative: (1) to receive from a user device a word to be searched, the word becoming a search argument, and (2) to send to the user device search results;
a processor operatively connected to the one or more interfaces; and
storage operatively connected to the processor and holding instructions that when executed activate the processor to:
generate a primary string of letters and secondary strings of letters from the search argument, the argument's $i^{th}$ secondary string generated by omitting the $i^{th}$ letter from the argument's primary string;
search the records' primary strings for equivalence with the argument's primary string and marking records containing equivalent primary strings;
search each record's $i^{th}$ secondary string for equivalence with the argument's $i^{th}$ secondary string and marking records containing equivalent $i^{th}$ secondary strings;
search each secondary string of each record for equivalence with the argument's primary string and marking records containing equivalent secondary strings; and
for each marked record, retrieve the word from the source file that is associated with the marked record in the index file;

wherein the retrieved words become the search results to send to the user device;

wherein the primary string of letters in the records of the index file and the primary string of letters from the search argument are generated by:

omitting all vowels from the word to be tested for phonetic similarity and from the search argument, except the first letters, if the first letters are vowels; and if two adjacent letters are the same consonant, omitting one of the two adjacent letters.

\* \* \* \* \*